United States Patent [19]
Dahlman

[11] Patent Number: 5,529,500
[45] Date of Patent: Jun. 25, 1996

US005529500A

[54] TWO-DIMENSIONAL EARTH-MOON-SUN INSTRUCTIONAL MODEL

[76] Inventor: Luann E. Dahlman, 7649 E. Euclid Ave., Mesa, Ariz. 85208

[21] Appl. No.: 316,871

[22] Filed: Oct. 3, 1994

[51] Int. Cl.⁶ .................................................. G09B 27/02
[52] U.S. Cl. .......................................... 434/292; 434/284
[58] Field of Search .................... 434/284, 289, 434/292, 285, 394, 402, 130, 131, 150, 106; 33/269; 368/15-20

[56] References Cited

U.S. PATENT DOCUMENTS

| | | | |
|---|---|---|---|
| 321,000 | 6/1885 | Berneike | 434/284 |
| 327,631 | 10/1885 | Whitcomb | 434/284 |
| 477,846 | 6/1892 | Rassweiler | 434/284 |
| 522,082 | 6/1894 | Nichols | 434/292 |
| 550,523 | 11/1895 | Nichols | 434/292 |
| 554,809 | 2/1896 | Yaggy . | |
| 854,513 | 5/1907 | Martin | 434/292 |
| 2,475,620 | 7/1949 | Justice | 434/284 |
| 2,943,435 | 7/1960 | Gorsuch | 368/18 |
| 3,373,493 | 3/1968 | McDonald | 33/269 |
| 4,194,306 | 3/1980 | Rogers | 434/285 |
| 4,334,297 | 6/1982 | Oros | 368/15 X |
| 5,114,348 | 5/1992 | Tzeng | 434/284 |

FOREIGN PATENT DOCUMENTS 7044   4/1884   United Kingdom ................... 434/284

*Primary Examiner*—Jessica J. Harrison
*Assistant Examiner*—Michael O'Neill
*Attorney, Agent, or Firm*—Antonio R. Durando

[57] ABSTRACT

A disk that illustrates a polar view of the earth rotatably mounted on a flat supporting base representing a celestial plane through the earth's equator. A radial arm is provided with its proximal end pivotally mounted on the center of the earth disk and its distal end fitted with a fixed disk representing the moon, such that the moon's orbit is modeled by the arm's rotation around the earth showing the near side of the moon always facing the earth. Half of the moon disk is covered by a semicircular structure representing the zone of exposure to sunlight, which can be used to explain the gradual and continuous change of moon phase as the moon revolves around the earth. Other embodiments of the invention illustrate the seasonal change of the earth's exposure to sunlight, the moon's effect on tides, and the earth's and moon's revolutions around the sun.

18 Claims, 6 Drawing Sheets

TWO-DIMENSIONAL EARTH-MOON-SUN INSTRUCTIONAL MODEL

BACKGROUND OF THE INVENTION

1. Field of the Invention

This invention is related in general to tutorial devices for classroom and similar activities. In particular, it describes an instructional tool for studying and illustrating interrelationships between the earth, moon, and sun.

2. Description of the Related Art

Since the days of Copernicus and Galileo, teachers have struggled with ways to explain to pupils the interrelationship between the sun, the earth and the moon in simple, easily understandable terms. Even in modern days, basic misconceptions remain about the workings of the sun, moon and earth in creating lunar phases and seasons. For example, even well-educated people commonly believe, incorrectly and in spite of having been taught properly at some point in their lives, that the moon's apparent phases are the result of the earth's shadow upon it. That this is incorrect would be easily understandable and more likely to be remembered if visualized with the aid of a planetary model.

In order to help illustrate the relative motion of the sun, the planets, their moons, and their influence on each other, people have devised tutorial instruments that approximate the relative position of the celestial bodies of interest. One such device is described in U.S. Pat. No. 554,809 to Yaggy (1896). The invention consists of a chart to illustrate the changes in the moon as it travels in its orbit around the earth. A stationary frame with openings through which the sun and earth are illustrated and various rotating structures are employed to display the relative position of the three bodies at different times during their motion through space.

Another, more recent invention is disclosed by Tzeng in U.S. Pat. No. 5,114,348 (1992) to illustrate lunar phases. The device consists of the combination of a stationary base containing rings with moon pictures and calendar information with rotating elements representing the moon and earth's longitudinal positions. The movable elements are used in conjunction with the fixed rings on the base to obtain moon data for selected times and earth longitudes.

These devices are rather complicated and cumbersome, and cannot be used to illustrate the relative position and attitude of each body with respect to the other two as the sun, moon and earth move through space. Therefore, there still exists a need for a simple, inexpensive and easily-operable device suitable for use as an instructional tool. This invention provides a simple apparatus that fulfills this need.

BRIEF SUMMARY OF THE INVENTION

The primary objective of this invention is an instructional tool for illustrating the motion and appearance of the moon as it revolves around the earth and their positions relative to each other and the sun at all times.

Another goal of the invention is a tool that permits a user to illustrate the moon's permanent exposure of the same side to the earth and correspondingly its constantly-varying exposure to the sun, thereby creating the moon's phases.

Another objective is a device that illustrates how the moon's motion around the earth effects rising and setting times of the moon.

Still another goal of the invention is the ability to illustrate the difference in the earth's exposure to sunlight at various times in the year.

Another objective is to provide an option whereby the sun's and moon's effects on the oceans' tides are illustrated.

Finally, an objective is a design and method of manufacture for such a tutorial device that accomplishes the above mentioned goals in an economical and commercially viable manner. This is done by utilizing simple components that are either already available commercially or that can be produced at competitive prices.

Therefore, according to these and other objectives, the present invention consists of a disk illustrating a polar view of the earth rotatably mounted on a flat supporting base representing a celestial plane through the earth's equator. A radial arm is provided with its proximal end pivotally mounted on the center of the earth disk and its distal end fitted with a fixed disk representing the moon, such that the moon's orbit is modeled by the arm's rotation around the earth showing the near side of the moon always facing the earth. Half of the moon's disk is covered by a semicircular structure representing the zone of exposure to sunlight, which can be used to explain the gradual and continuous change of moon phase as the moon revolves around the earth. Other embodiments of the invention illustrate the seasonal change of the earth's exposure to sunlight, the moon's effect on tides, and the earth/moon system's revolutions around the sun. Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DESCRIPTION OF THE PREFERRED EMBODIMENTS OF THE INVENTION

The present invention amounts to a simplified but very illustrative model of the earth's and moon's relative position with respect to one another and of their exposure to sunlight at any time during the year, including a simple representation of the sun's and moon's effect on ocean tides and of different light zones associated with changed seasons.

Figure 1:
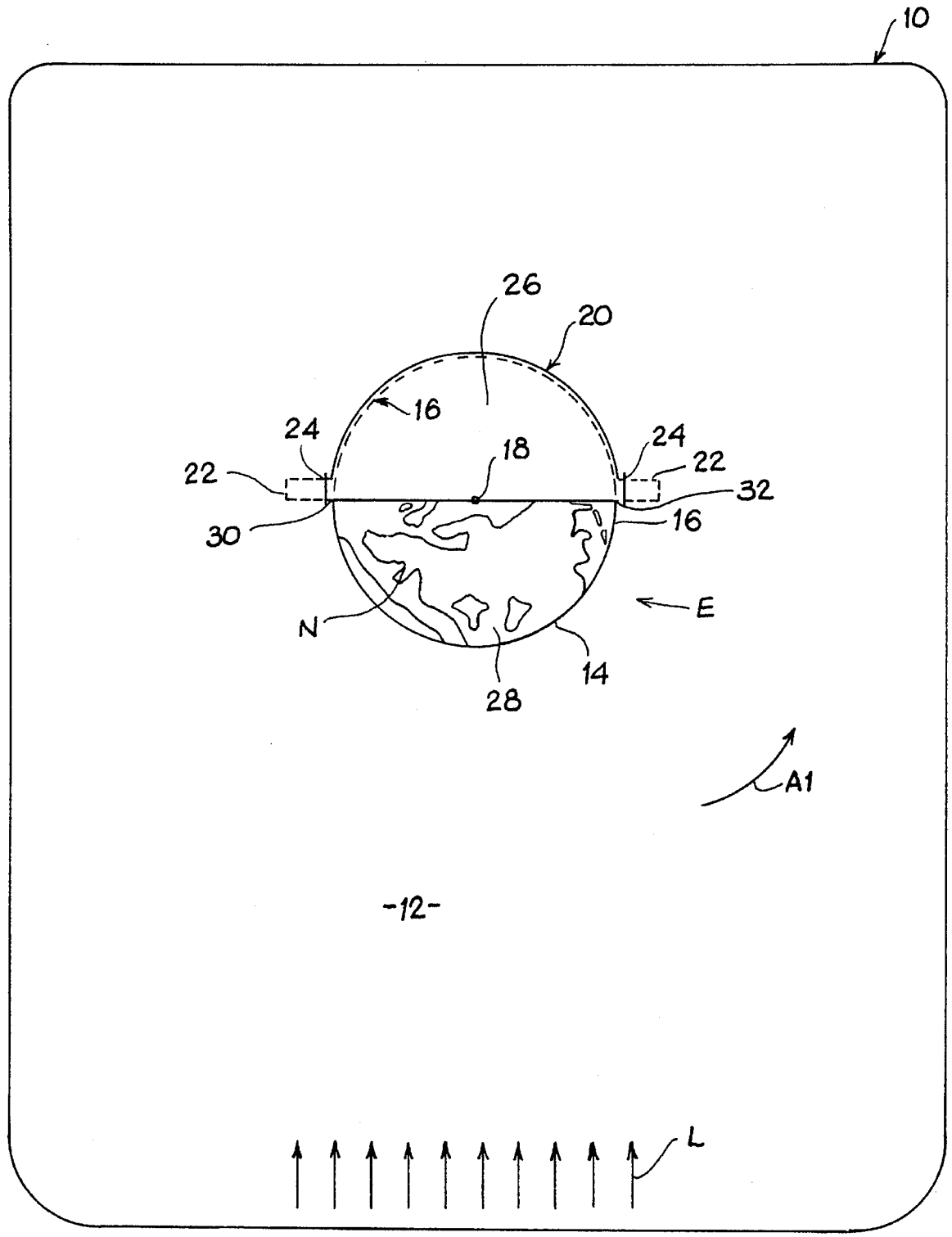
FIG. 1 is a plan view of a support base containing a disk representing a polar view of the earth rotatably mounted on the base according to the present invention.

Referring to the drawings, wherein like parts are designated throughout with like numerals and symbols, FIG. 1 illustrates in plan view a substantially-rigid support frame 10 for a lunar-astronomy tutorial device according to the invention representing a portion of the earth's equatorial plane 12. Such celestial plane 12 is also approximately parallel to the earth's orbital plane around the sun; therefore, sunlight is represented in the model of the invention by the approximation of substantially parallel light rays L traveling away from the sun and toward the earth E. The plane 12 passes through the equator 14 of the earth E (i.e., the terminator or shadow line passes through the poles), so that about one half of the earth's globe is illuminated at all times, as one skilled in the art would know. The earth E is represented in the device of the invention by an earth disk 16 rotatably mounted on the frame 10 by a retaining pin 18 or other equivalent means passing through the center of the disk 16 (i.e., along the polar axis of the earth E) and through the underlying support frame 10. Note that the earth E is shown in the figures from a northern perspective, displaying the north pole and the northern hemisphere N on the disk 16, but the invention could be practiced in equivalent manner with reference to the south pole and the southern hemisphere.

Figure 2:
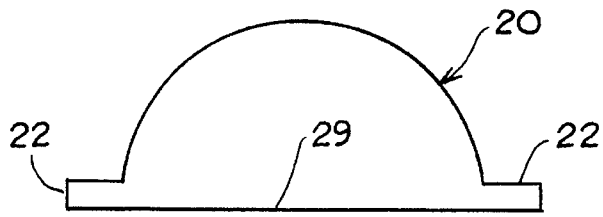
FIG. 2 is a top plan view of an earth-terminator overlay of the invention for use to cover the earth model of FIG. 1.

A preferably-transparent and preferably-dark semicircular structure or earth-terminator overlay 20, shown as a separate component in FIG. 2, is also fixedly mounted on the frame 10 in slidable arrangement over the rotating disk 16 on the side opposite to that of the sun to represent the portion of the earth that is dark. The earth-terminator overlay 20 is fixed to the frame 10 in such a way that it will allow the free rotation of the earth E around its polar axis (pin 18) under the earth-terminator overlay, such as by means of radially-extending tabs 22 inserted into receiving slots 24 in the supporting frame 12. For ease of installation and removal (by insertion and extraction of the tabs 22 into and from the slots 24, respectively), the earth-terminator overlay 20 is preferably made of transparent and flexible material that can be bent during the operation, such as acetate or similar plastic material. Thus, the earth-terminator overlay 20 is used to show the dark side 26 of the earth E in the model of the invention (see FIG. 1), leaving the sunlit side 28 exposed to the light rays L coming from the sun. As those skilled in the art would understand, the earth-terminator line 29, which is shown as a distinct line of demarcation along the diameter of the disk 20, could easily be replaced with a band consisting of a gradually-darkening shaded area to illustrate the twilight zone that actually separates light from dark at dawn and dusk. It is easily understood that this model of the earth can be utilized to explain how the sun rises and sets over rising and setting lines 30 and 32, respectively, by rotating the disk 16 in the direction of arrow A1 to simulate the earth's west-to-east diurnal rotation around its polar axis, thus illustrating how exposure to sunlight varies throughout a day for any point on earth.

Figure 4A:
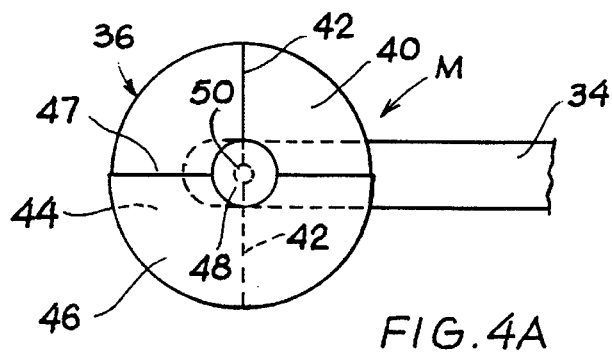
FIG. 4A is a top plan view of the lunar disk assembly of the invention.
Figure 3:
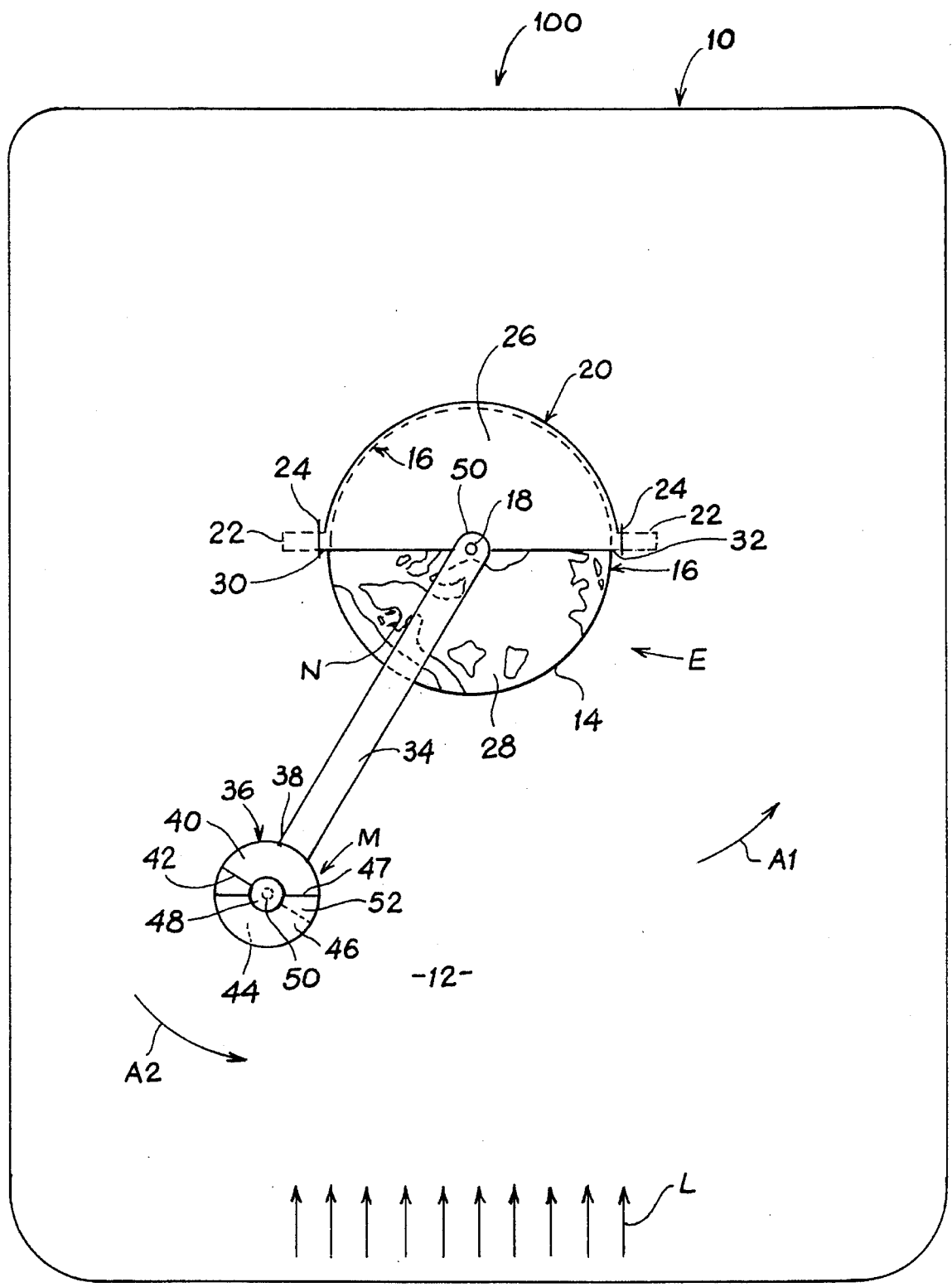
FIG. 3 is the assembly of FIG. 1 further containing a moon adapted for revolution around the polar axis of the earth.

FIG. 3 shows the tutorial device 100 of the invention, which consists of the basic structure of FIG. 1 including, in addition, a model of the moon M revolving around the earth E on an orbit created by a radial arm 34 substantially on the same celestial plane 12 represented by the supporting frame 10. As shown in more detail in FIGS. 4A and 4B, the lunar model M consists of a moon disk 36 that is fixedly mounted on the distal end 38 of the radial arm 34, such as by glueing or other fastening means, so that the same visible side 40 (the near side) of the lunar disk 36 always faces the arm 34 and, therefore, the earth E. A moon visible-horizon line 42 is marked on the moon disk 36, perpendicular to the main axis of the radial arm 34, to divide the side 40 of the moon disk 36 that faces the earth from the far side 44 that is permanently facing outer space (and that, therefore, is never visible from earth).

Figure 4B:
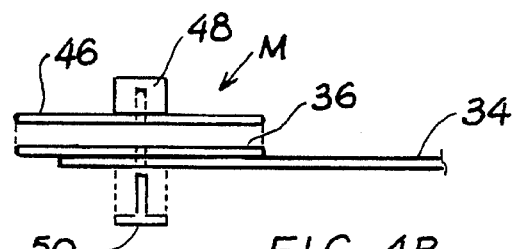
FIG. 4B is a partially-exploded elevational side view of the lunar disk assembly of FIG. 4A.

A preferably-transparent and preferably-light semicircular structure or moon-terminator overlay 46 is rotatably mounted on the distal end 38 of the radial arm 34 in slidable concentric arrangement over the moon disk 36. The moon-terminator overlay 46 is adapted for permanent positioning facing sunlight, that is, such that the terminator line 47 is perpendicular to the light rays L, to illustrate the portion of the moon that is exposed to sunlight at any time during its revolution around the earth. As shown in the figures, this can be easily achieved by attaching the overlay 46 to a knob 48 and connecting the two in rotatable fashion to the moon disk 36 by means of a retaining pin 50 slidably threaded through the distal end 38 of the arm and the center of the disk 36, and fixedly inserted into the knob 48. The partially-exploded, elevational view of FIG. 4B illustrates the way these components are assembled. Finally, the proximal end 50 of the radial arm 34 is also pivotally connected to the retaining pin 18, so that the entire arm/moon assembly may be rotated around the earth E to simulate the moon's periodic revolutions.

Figure 5:
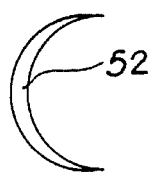
FIG. 5 is an illustration of the view of the moon from earth when positioned as shown in the arrangement of FIG. 3.

Thus, a user can grab the knob 48 and cause the moon M to revolve around the earth E as the radial arm 34 is rotated along a circular orbit. At the same time, the user can easily control the position of the moon-terminator overlay 46 with the knob 48 to ensure that the overlay remains pointed toward the sun to show the areas of the moon that are exposed to sunlight. The flexibility of the radial arm 34 allows a user to lift the moon disk 36 above the orbital plane 12 to show that it is not usually in the earth's shadow when in a full-moon position. It is apparent that the tutorial device 100 of the invention can be used to demonstrate to a pupil the interplay between the moon's exposure to sunlight (represented by the moon-terminator overlay 46) and its exposure to earth (represented by the visible side 40 proximal to the line 42). As one skilled in the art would understand, the part of the moon actually seen from earth at any time is that portion of the visible side 40 that is also covered by the overlay 46. For example, the surface of the moon corresponding to the area 52 in FIG. 3 would be visible under the conditions there illustrated in the form of a waning crescent moon, as shown in FIG. 5. Similarly, by moving the moon assembly in the direction of arrow A2, which corresponds to the moon's orbital direction of motion, one could not only show the change of the visible part of the moon during a revolution but also explain the interaction of the phenomena that make it so. For instance, when the moon is positioned as far as possible away from the sun, as illustrated in FIG. 6, the visible side 40 would be fully covered by the moon-terminator overlay 46 to reveal a full moon, as expected.

Figure 7:
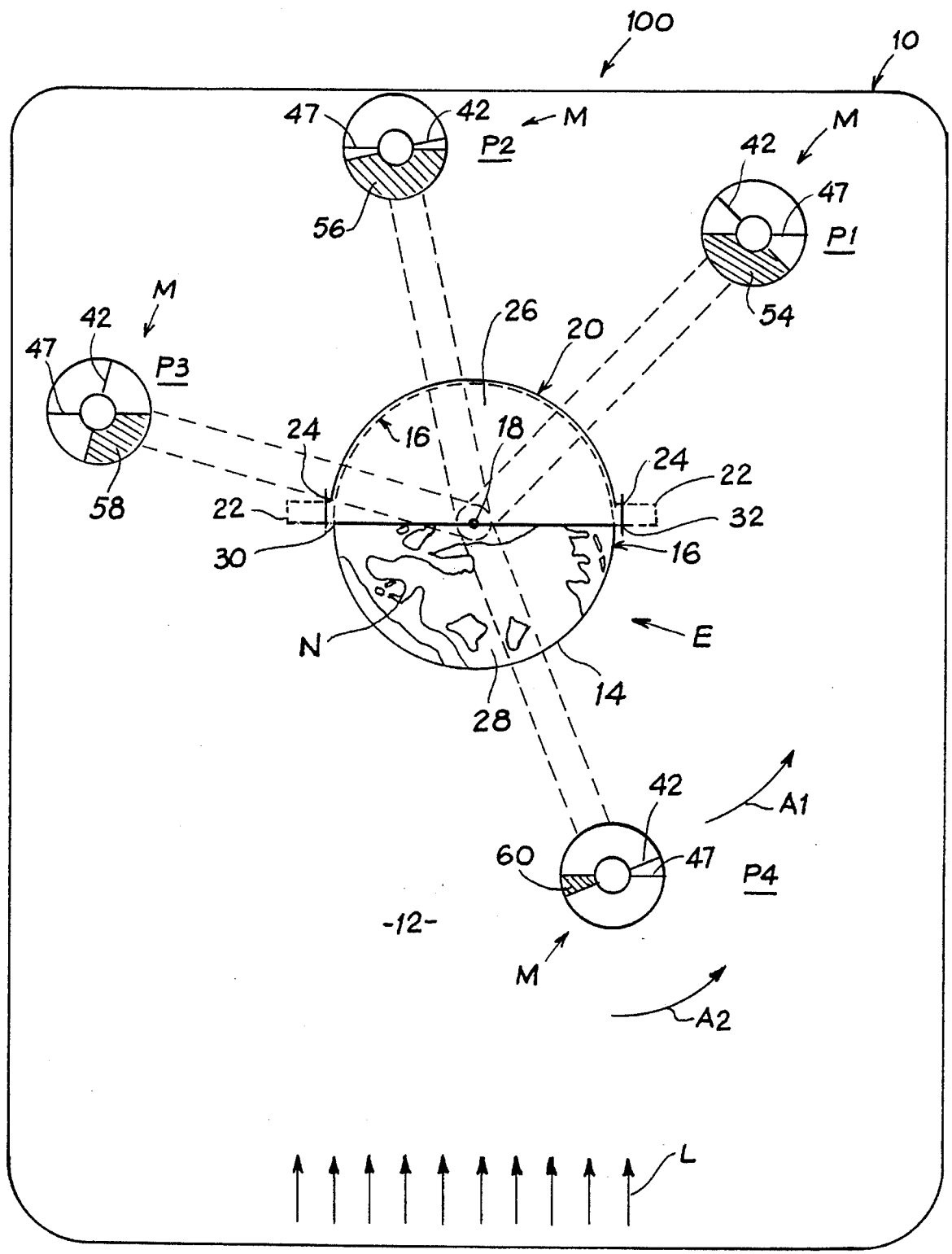
FIG. 7 is an illustration of several moon-assembly positions as seen during use of the tutorial device of the invention.

Thus, the intersection between the moon-terminator overlay 46 and the visible side 40 represents at all times the portion of the moon that a viewer can see from earth as the moon revolves around our planet. FIG. 7 shows the moon E in four different positions around the earth, P1, P2, P3 and P4, to illustrate four corresponding visible portions of the moon, 54, 56, 58 and 60, respectively (shown as shaded areas for clarity of illustration).

Figure 9A:
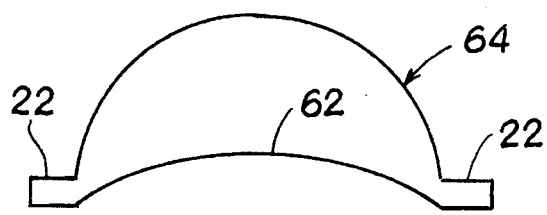
FIG. 9A is a top plan view of a second earth-terminator overlay of the invention to illustrate the zone of the earth exposed to sunlight at summer solstice.
Figure 9B:
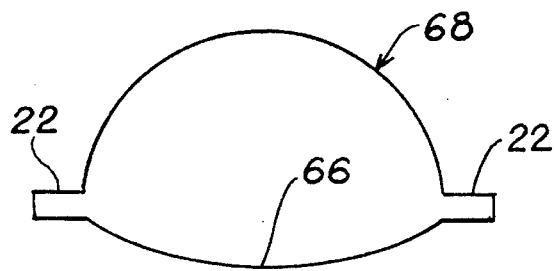
FIG. 9B is a top plan view of a third earth-terminator overlay of the invention to illustrate the zone of the earth exposed to sunlight at winter solstice.
Figure 8:
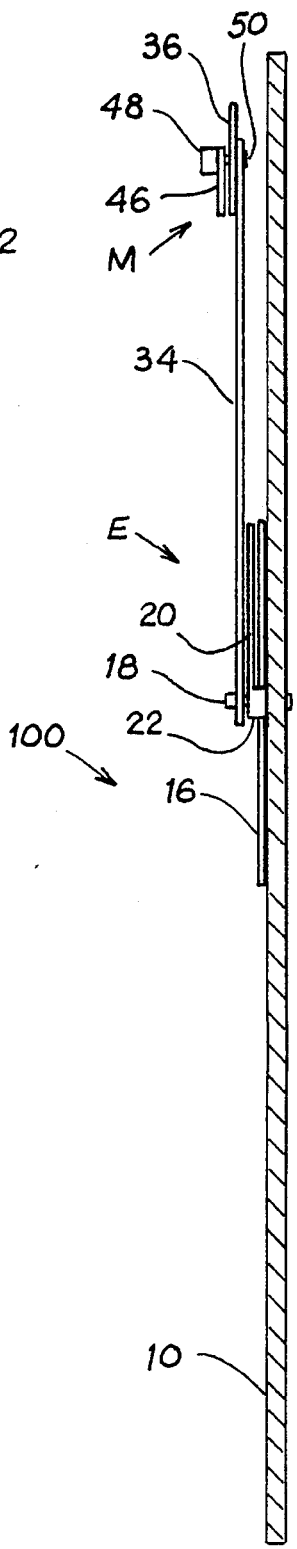
FIG. 8 is a cross-sectional view of the apparatus of FIG. 6 as seen from line 8—8 in that figure.
Figure 6:
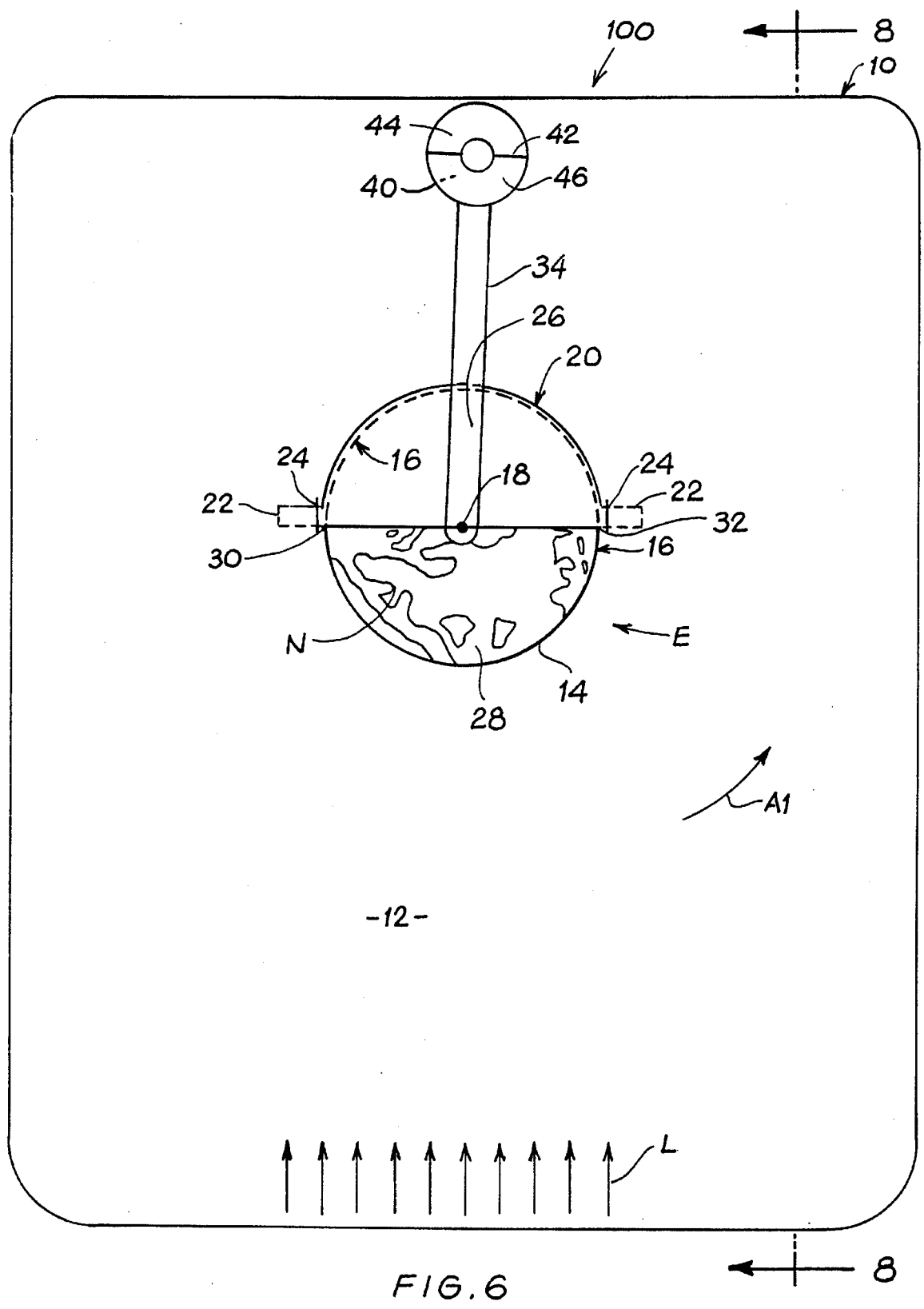
FIG. 6 is another illustration of the invention shown in FIG. 3, wherein the moon assembly has been moved to a full-moon position.

FIG. 8 is an elevational side view of the tutorial device 100 of the invention as seen from lines 8—8 in FIG. 6 to illustrate the details of assembly of the various components. Note that the earth-terminator overlay 20 is easily removable by extracting the tabs 22 from the receiving slots 24 in the support frame 10. Accordingly, variations of the overlay may be provided to illustrate the earth terminator line at different times during the year. For example, a concave line 62 would be used to model the earth terminator during summer solstice, as shown in the summer-solstice terminator overlay 64 of FIG. 9A. Similarly, a convex line 66 would be used for a winter-solstice overlay 68, as shown in FIG. 9B. Either overlay may be used to replace the earth-terminator overlay 20 to explain the difference in the amount of daylight in each hemisphere between summer and winter.

Figure 10:
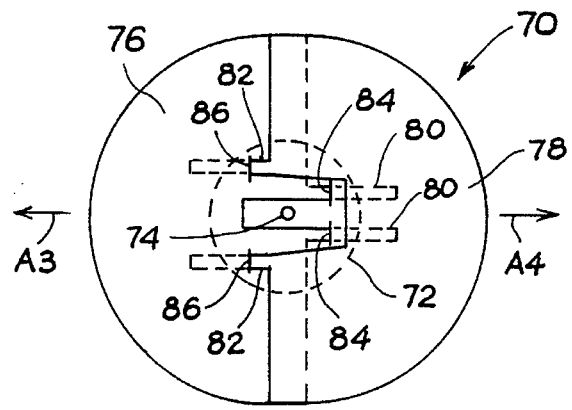
FIG. 10 is a plan view of an ocean-tide disk provided as an accessory to the invention.

Another accessory for the tutorial device of the invention may be used to illustrate the effect of the moon and sun on the earth's oceans' tides. As illustrated in FIG. 10, a slightly oval (having a larger equatorial diameter) ocean-tide disk 70 is provided, which consists of a circular base 72 with a central perforation 74 adapted for rotatable installation under the earth disk 16 by means of the retaining pin 18. The ocean-tide disk 70 also comprises two separate hemispheres 76 and 78 slidably mounted on the circular base 72 by means of tabs 80 and 82 inserted through receiving slots 84 and 86, respectively. The effect of this configuration is that the hemispheres may be pulled out diametrically from the circular base 72, as indicated by arrows A3 and A4, to illustrate the varying deformation of the oceans as the relative positions of the sun and moon change with respect to the earth. Note that the earth-terminator overlay 20 is not utilized to cover the dark side of the earth when the ocean-tide disk 70 is used under the earth disk 16, so that the disk 70 may be freely rotated around the retaining pin 18 to follow the moon M and demonstrate its effect on the earth's tides during the planet's daily rotation around its polar axis (represented by pin 18).

Figure 11:
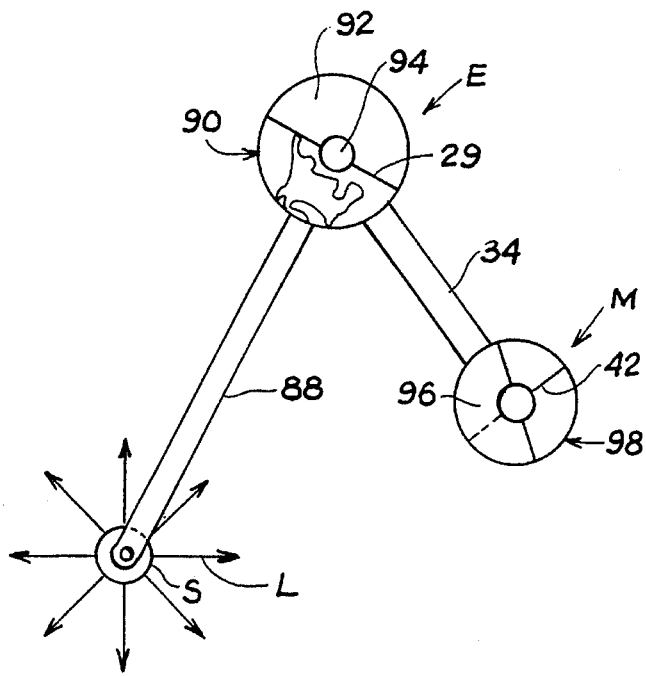
FIG. 11 is a plan view of an alternative embodiment including a model of the sun within the apparatus of the invention.

In another embodiment 102 of the invention shown in FIG. 11, the sun S is included in the support frame 10 of the invention and the earth E is also pivotally mounted on a radial arm 88 to model the earth's annual revolution around the sun. A rotatable earth disk 90 partially covered by an earth-terminator overlay 92 attached to a knob 94 and a rotatable moon-terminator overlay 96 covering a moon disk 98 fixed to the radial arm 34 are provided, as for the first embodiment of FIG. 3, and used in similar fashion to illustrate the moon phases and other phenomena discussed above, as would be obvious to one skilled in the art.

It is noted that while the invention is described in terms of a moon-terminator overlay that models the moon hemisphere exposed to sunlight, it could be practiced equivalently by providing means for modeling the hemisphere exposed to darkness (such as by a dark overlay rotated by 180 degrees). Obviously, all tutorial steps would have to be adjusted accordingly. For instance, the moon phase would be that part of the near side 40 that is not covered by such dark overlay. Similarly, the earth-terminator overlay could be replaced by one illustrating the portion of the earth exposed to sunlight, rather than darkness. Moreover, the specific configuration of the apparatus can be changed by substituting any of the structural members described herein with an equivalent member, so long as its functionality is maintained.

Note also that the model of the invention is obviously not manufactured to scale, but it is intended for illustrative purposes only. Many approximations in the invention do not reflect the exact real world but nevertheless make it possible to use the model as a useful instructional tool. For example, the orbit of the moon is not exactly coplanar with the orbit of the earth, nor exactly circular, as illustrated in the model of the invention. Rather, the orbital plane of the moon is usually at an angle that permits sunlight to strike the moon directly even when it is on the side of the earth away from the sun (that is, at a point farthest from the sun). Nonetheless, these approximations do not effect the viability of the invention and are useful for simplifying its construction requirements.

The preferred material for manufacturing the apparatus of the invention is transparent plastic colored to fulfill the desired need, as explained above, or printed with the information necessary to fully exploit the function of the invention, such as a geographical map for the earth and a visible-horizon line for the moon. The remaining components constitute simple hardware, such as knobs and pins, as necessary to assemble the various parts of the invention into a working earth-moon-sun model.

Various other changes in the details, steps and materials that have been described may be made by those skilled in the art within the principles and scope of the invention herein illustrated and defined in the appended claims. Thus, while the present invention has been shown and described herein in what is believed to be the most practical and preferred embodiment, it is recognized that departures can be made therefrom within the scope of the invention, which is not to be limited to the details disclosed herein but is to be accorded the full scope of the claims so as to embrace any and all equivalent apparatus and methods.

I claim:

1. A two-dimensional earth-moon-sun instructional model, comprising:

(a) a support frame containing a means for indicating a direction of sunlight travel parallel thereto;

(b) an earth disk rotatably mounted on said frame;

(c) a moon disk mounted on said frame and adapted for movement along a coplanar orbit around said earth disk, said moon disk having a center and a circular edge and comprising two azimuthal projections 180 degrees apart from the center to the edge of the moon disk, said projections separating a near side of the moon disk permanently disposed toward said earth disk and a far side permanently disposed away from the earth disk;

(d) means for continuously indicating a demarcation between a zone of daylight and a zone of darkness on said earth disk as the earth disk is rotated to simulate earth rotations; and (e) means for continuously indicating a demarcation between a zone of light and a zone of darkness on said moon disk as the moon disk is moved along said coplanar orbit to simulate moon revolutions.

2. The instructional model of claim 1, wherein said means for indicating a direction of sunlight travel consists of a direction indicator printed on said support frame.

3. The instructional model of claim 1, wherein said moon disk is fixedly mounted on a radial arm pivotally coupled to said support frame for rotation around said earth disk.

4. The instructional model of claim 1, wherein said means for continuously indicating a demarcation between a zone of daylight and a zone of darkness on said earth disk consists of an approximately semicircular earth-terminator overlay disposed over a half of the earth disk in a position in said direction of sunlight travel, such that the earth disk may be freely rotated thereunder.

5. The instructional model of claim 4, wherein said approximately semicircular earth-terminator overlay is removably disposed over said half of the earth disk.

6. The instructional model of claim 1, wherein said means for continuously indicating a demarcation between a zone of light and a zone of darkness on said moon disk consists of an approximately semicircular moon-terminator overlay rotatably mounted over a half of the moon disk and adapted for retention in a substantially constant direction during use.

7. The instructional model of claim 6, wherein said approximately semicircular moon-terminator overlay is adapted for retention in a position in said direction of sunlight travel.

8. The instructional model of claim 6, wherein said approximately semicircular moon-terminator overlay is adapted for retention in a position opposite to said direction of sunlight travel.

9. The instructional model of claim 6, further comprising a knob fixedly attached to said rotatable, approximately semicircular moon-terminator overlay for retaining it in said substantially constant direction during use.

10. The instructional model of claim 3, wherein said means for continuously indicating a demarcation between a zone of daylight and a zone of darkness on said earth disk consists of an approximately semicircular earth-terminator overlay disposed over a half of the earth disk in a position in said direction of sunlight travel and such that the earth disk may be freely rotated thereunder.

11. The instructional model of claim 3, wherein said means for continuously indicating a demarcation between a zone of light and a zone of darkness on said moon disk consists of an approximately semicircular moon-terminator overlay rotatably mounted over a half of the moon disk and adapted for retention in a substantially constant direction during use.

12. A two-dimensional earth-moon-sun instructional model, comprising:

(a) a support frame containing a means for indicating a direction of sunlight travel parallel thereto;

(b) an earth disk rotatably mounted on said frame;

(c) a moon disk fixedly mounted on a radial arm pivotally coupled to said frame for rotation around said earth disk and adapted for movement along a coplanar orbit around said earth disk, said moon disk comprising a visible horizon separating a near side permanently disposed toward said earth disk and far side permanently disposed away from the earth disk;

(d) means for continuously indicating a demarcation between a zone of daylight and a zone of darkness on said earth disk as the earth disk is rotated to simulate earth rotations; and (e) means for continuously indicating a demarcation between a zone of light and a zone of darkness on said moon disk as the moon disk is moved along said coplanar orbit to simulate moon revolutions;

wherein said means for continuously indicating a demarcation between a zone of daylight and a zone of darkness on said earth disk consists of an approximately semicircular earth-terminator overlay disposed over a half of the earth disk in a position in said direction of sunlight travel and such that the earth disk may be freely rotated thereunder; and wherein said means for continuously indicating a demarcation between a zone of light and a zone of darkness on said moon disk consists of an approximately semicircular moon-terminator overlay rotatably mounted over a half of the moon disk and adapted for retention in a substantially constant direction during use.

13. The instructional model of claim 12, further comprising an ocean-tide disk adapted for rotatable installation between said support frame and said earth disk in concentric arrangement therewith, wherein said ocean-tide disk comprises two diametrically expandable hemispheres for simulating earth oceans' tides.

14. The instructional model of claim 12, further comprising a knob fixedly attached to said rotatable, approximately semicircular moon-terminator overlay for retaining it in said substantially constant direction during use.

15. The instructional model of claim 14, wherein said approximately semicircular earth-terminator overlay is removably disposed over said half of the earth disk.

16. The instructional model of claim 15, further comprising an ocean-tide disk adapted for rotatable installation between said support frame and said earth disk in concentric arrangement therewith, wherein said ocean-tide disk comprises two diametrically expandable hemispheres for simulating earth oceans' tides.

17. The instructional model of claim 16, wherein said approximately semicircular moon-terminator overlay is adapted for retention in a position in said direction of sunlight travel.

18. A two-dimensional earth-moon-sun instructional model, comprising:

(a) a support frame;

(b) a sun disk substantially centrally-positioned within said support frame;

(c) an earth disk mounted on said frame and adapted for movement along an earth coplanar orbit around said sun disk;

(d) a moon disk mounted on said earth disk and adapted for movement along a coplanar orbit around said earth disk, said moon disk having a center and a circular edge and comprising two azimuthal projections 180 degrees apart from the center to the edge of the moon disk, said projections separating a near side of the moon disk permanently disposed toward said earth disk and a far side permanently disposed away from the earth disk;

(e) means for continuously indicating a demarcation between a zone of daylight and a zone of darkness on said earth disk as the earth disk is rotated to simulate earth rotations; and (f) means for continuously indicating a demarcation between a zone of light and a zone of darkness on said moon disk as the moon disk is moved along said coplanar orbit to simulate moon revolutions.

* * * * *